July 31, 1951     P. WEED     2,562,248
LUNCH BOX CONTAINER
Filed Aug. 18, 1948
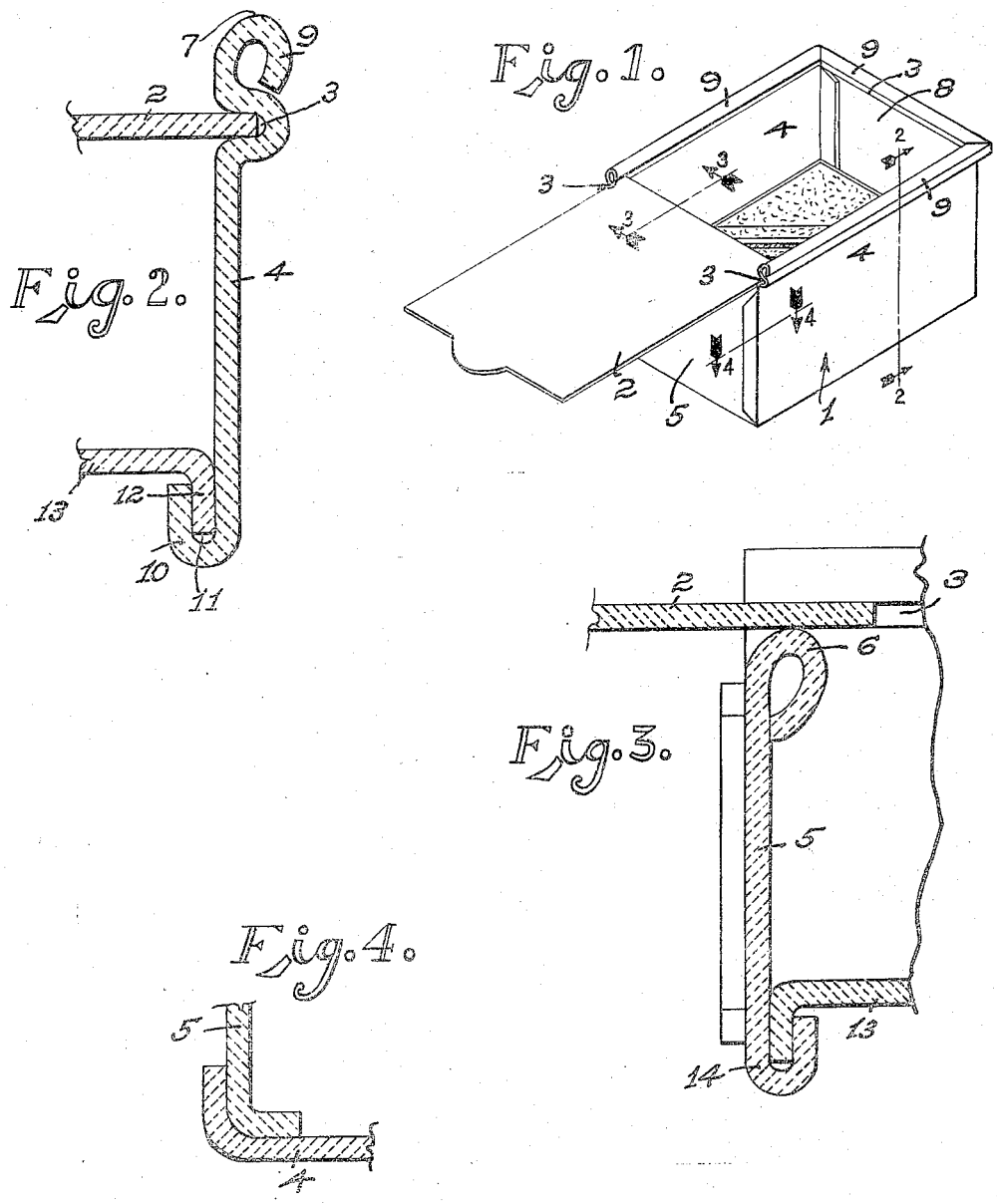
INVENTOR.
PEARL WEED Patented July 31, 1951

2,562,248

UNITED STATES PATENT OFFICE 2,562,248

LUNCH BOX CONTAINER

Pearl Weed, Wichita, Kans.

Application August 18, 1948, Serial No. 44,969

1 Claim. (Cl. 220—41)

This invention relates to a lunch box food container of special construction and design for the storage of foods of different kinds in the ordinary lunch boxes used by workmen and others who carry lunches with them to their place of employment, or for use at picnics or in fact any place that is attended for either business or pleasure.

Lunch pails or boxes not provided with separate containers for different foods have been found unsatisfactory in many ways, because food not separated by individual containers are very apt to transmit their odors, flavors, or moisture to adjacent foods stored in the same lunch pail, and this even through they may be wrapped in waxed or other covering material, so that the provision of a separate container for each individual food packed in the lunch pail is desirable.

It is an object of the invention to provide a container of special construction and material in which individual articles of food may be placed and sealed against ingress or egress of other food odors or moisture during the time the foods are usually stored in a lunch pail.

It is also an object of the invention to so design and construct the individual food containers of a material that will be proof against temperature changes and the absorption of moisture or odors from other foods stored in the same container.

It is also a further object of the invention to construct the individual food containers of a material that has insulation properties and that can be molded or shaped without necessarily applying heat during the molding or shaping thereof.

Of the materials that may be used and suitable for the containers might be mentioned plastics, odorless rubber compositions, flexible glass or ordinary glass, which however might require heat in shaping, "Bakelite" and many other materials used regularly in the trades and industries that are molded and shaped with or without heat through ordinary practices in manufacturing articles of this nature.

Reference may now be had to the drawings accompanying this specification wherein figures of like character represent like parts in the several views, and wherein the parts are not necessarily drawn to exact scale or dimensions but are shown in a manner to best illustrate the preferred manner of construction and design.

Figure 1 is a perspective of a lunch box container with a sliding lid opened to show the interior and somewhat the manner of construction.

Figure 2 is a sectional elevation taken on substantially the line 2—2 of Figure 1 and shows the manner of shaping the sides and bottom for the insertion of the sliding cover.

Figure 3 is a vertical sectional elevation taken on substantially the line 3—3 of Figure 1 showing the construction of the end section and the cover partly entered into its closing groove and sliding in contact with the curled top edge of the end section.

Figure 4 is a section taken on substantially the line 4—4 of Figure 1 to show the manner of bending the walls around each other to form the corner joint.

The numeral 1 represents the container as a whole, 2 is the cover which in Figure 1 is shown just entering the grooves 3 in the side walls 4. The end wall 5 best shown in Figure 3 has its top edge bent over into a loose curl presenting a rounded top edge over which the cover 2 slides and engages as it is pushed home to close the top of the container, and it is noted by reference to Figure 1 that the groove 3 runs around three sides of the formed container, so that with the cover closely fitting the container on three sides by its engagement with the groove 3 and its sliding engagement with the top curled edge 6 of the front end panel the container is quite tightly closed against the ingress or egress of odors or moisture from other foods stored in the container as well as preventing the access of outside odors or moisture from entering the container. The top edge 7 of the side walls 4 and the end wall 8 are curved as is well shown in Figure 2 as indicated at 9 so that a smooth round edge is provided.

By reference to Figure 2 it is seen that the side walls 4 are bent and formed during manufacture to form the groove 3 into which the cover 2 slides, also in Figure 2 is seen how the side wall 4 has a bent lip on the lower edge as at 10 forming a recess 11 into which the bent edge 12 of the bottom wall 13 enters and is sealed therein by any known means employed for the particular material being used for the walls of the container.

Figure 4 shows the manner of joining the sides and ends by bending the edges thereof and overlapping them and sealing them in the best manner available for the material being used.

Figure 3 shows the joining of the ends and sides of the container as at 14 which is substantially the same as described for joining the walls at the bottom of Figure 2.

From the foregoing it is seen that my invention provides a container made of a sheet plastic or like material wherein none of the material is cut away from the wall areas to weaken them and wherein the wall areas are of equal thickness throughout the entire container which enhances any insulating qualities the container may have to protect the stored food from changes of temperature or humidity and being sealed tightly with a plastic lid made of the same material as the body of the container the container is practically a sealed container for the purpose intended and for the time that foods will be stored therein.

What I claim as new and desire to secure by Letters Patent is:

A container for storing food materials in lunch boxes or the like comprising side and end walls and a bottom wall all of equal thickness, and made of a suitable plastic or like material, the bottom edges of the side and end walls being bent to overlap and sealed in any manner suitable to the material used, the top edge portion of the sides and one end wall being curled outwardly to form a rounded top edge, the sides and last named end wall having an inwardly facing planar groove closely adjacent said curled top edge, a sliding cover adapted to enter said groove to seal said container and the top edge of the other end wall being curled into a loose bead which slidably contacts the lower face of the cover.

PEARL WEED.

REFERENCES CITED

The following references are of record in the file of this patent:

UNITED STATES PATENTS

| Number | Name | Date |
|---|---|---|
| 2,004,449 | Stanley | June 11, 1935 |
| 2,313,428 | Glenn | Mar. 9, 1943 |

FOREIGN PATENTS

| Number | Country | Date |
|---|---|---|
| 266,049 | Italy | July 17, 1929 |